(12) United States Patent
Hourselt

(10) Patent No.: US 8,141,142 B2
(45) Date of Patent: Mar. 20, 2012

(54) SECURE AUTHENTICATION OF SERVICE USERS OF A REMOTE SERVICE INTERFACE TO A STORAGE MEDIA

(75) Inventor: Andrew G. Hourselt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 11/057,812

(22) Filed: Feb. 14, 2005

(65) Prior Publication Data
US 2006/0185007 A1    Aug. 17, 2006

(51) Int. Cl.
H04L 29/06 (2006.01)
(52) U.S. Cl. .......................................... 726/10
(58) Field of Classification Search .............. 726/10
See application file for complete search history.

(56) References Cited

U.S. PATENT DOCUMENTS

| | | | |
|---|---|---|---|
| 4,800,590 A | 1/1989 | Vaughan | |
| 4,885,778 A | 12/1989 | Weiss | |
| 5,121,422 A | 6/1992 | Kudo | |
| 5,592,553 A | 1/1997 | Guski et al. | |
| 5,661,807 A | 8/1997 | Guski et al. | |
| 6,128,742 A | 10/2000 | Felt | |
| 6,189,096 B1 | 2/2001 | Haverty | |
| 6,275,941 B1 | 8/2001 | Saito et al. | |
| 6,324,648 B1 * | 11/2001 | Grantges, Jr. ................ | 726/12 |
| 6,425,085 B2 | 7/2002 | Hashikura | |
| 6,487,667 B1 | 11/2002 | Brown | |
| 6,704,868 B1 | 3/2004 | Challener et al. | |
| 6,718,468 B1 | 4/2004 | Challener et al. | |
| 6,725,382 B1 | 4/2004 | Thompson et al. | |
| 6,792,547 B1 | 9/2004 | Murata et al. | |
| 6,891,953 B1 * | 5/2005 | DeMello et al. ............. | 380/277 |
| 6,898,711 B1 | 5/2005 | Bauman et al. | |

(Continued)

FOREIGN PATENT DOCUMENTS

JP    2004046430    2/2004

(Continued)

OTHER PUBLICATIONS

IBM Corp., "Mechanism for Supporting Multiple Authentication Servers", [online], IBM Technical Disclosure Bulletin, Mar. 1992, [Retrieved on Sep. 29, 2004]. Retrieved from the Internet at <URL: https://www.delphion.com/tdbs/tdb?o=92A%2060741>, 2 pp.

(Continued)

*Primary Examiner* — Gilberto Barron, Jr.
*Assistant Examiner* — Devin Almeida
(74) *Attorney, Agent, or Firm* — David W. Victor; Konrad Raynes & Victor LLP

(57) ABSTRACT

A pair of servers are employed to provide a secure low-overhead authentication of a user. A certificate server of the pair receives personal information of the user from a first client over a first network and provides an encrypted user certificate to the first client over the first network, wherein the encrypted user certificate includes an encryption of one or more personal attributes of the user corresponding to the set of personal information. A device control server receives the encrypted user certificate from a second client over a second network and provides remote access information to the second client over the second network, wherein the remote access information facilitates remote access to a device by the user over the second network based in response to a verification by the device control server of the encrypted user certificate.

30 Claims, 6 Drawing Sheets

U.S. PATENT DOCUMENTS

| | | | |
|---|---|---|---|
| 2002/0059430 A1* | 5/2002 | Orbke et al. | 709/227 |
| 2004/0078573 A1 | 4/2004 | Matsuyama | |
| 2005/0120202 A1 | 6/2005 | Cuellar et al. | |
| 2006/0041761 A1* | 2/2006 | Neumann et al. | 713/189 |

FOREIGN PATENT DOCUMENTS

| | | |
|---|---|---|
| JP | 2004341897 | 12/2004 |
| JP | 2005011239 | 1/2005 |
| JP | 2005512396 | 4/2005 |

OTHER PUBLICATIONS

IBM CORP., "Voice Cybervault for Local and Internet Logins", IBM Technical Disclosure Bulletin, Mar. 2000, pp. 586-587.

L.J. Hughes, Jr./translated by Kouji Nagahara, "Actually Useful Internet Security Techniques", New Riders Publishing, 1995, pp. 1-26.

B. Schneier, "Applied Cryptography, Second Edition", US, John Wiley & Sons, Inc., 1996, pp. 52-53.

Y. Tokiniwa, et al., "Information Security NetWork Security", Mitsubishi Electric Engineering Company Limited, Mitsubishi E, vol. 72, No. 5, 1998.

English machine translation of JP 2004341897 published Dec. 2, 2004.

English machine translation of JP 2005011239 published Jan. 13, 2005.

"Information Materials for IDS" for JPO Office Action dated May 31, 2011.

* cited by examiner

SECURE AUTHENTICATION OF SERVICE USERS OF A REMOTE SERVICE INTERFACE TO A STORAGE MEDIA

FIELD OF INVENTION

The present invention generally relates to authenticating a user for remote access to a device. The present invention specifically relates to authenticating a service person for remote access to a storage media in a manner than verifies the service person is an authorized service person having an appropriate access level (e.g., service, support or enhanced) for remotely servicing the storage media.

BACKGROUND OF THE INVENTION

A service interface for remote service personal currently exists for enterprise-level tape controller products. This interface is invoked by a service person establishing a operative connection to the tape controller over a private network. Authentication of the service persons requires a verification that the service person is an authorized service person having an appropriate access level for remotely servicing a tape media controlled by the tape controller. Specifically, the authentication sequentially involves the service person obtaining an authentication key from the tape controller over the private network, the service person obtaining a system password corresponding to the authentication key from an access server over a public network, and the service person providing the system password to the tape controller over the private network to thereby gain desired access to a tape media. A challenge for the computer industry is to improve upon the user-convenience and process efficiency of the aforementioned authentication of a service person for remotely accessing a storage media over the private network as well as for any other person desiring remote access over a network to any type of device controlled by a server.

SUMMARY OF THE INVENTION

One embodiment of the present invention is a method for enabling a first client and a second client to establish an authentication of a user to remotely access a device. The method comprises the first client providing a first set of personal information of the user to a first server over a first network; the first client receiving an encrypted user certificate from the first server over the first network, wherein the encrypted user certificate includes an encryption by the first server of at least one personal attribute of the user corresponding to the first set of personal information; the second client providing the encrypted user certificate to a second server over a second network; and the second client receiving remote access information from the second server over the second network, wherein the remote access information facilitates remote access to the device by the user over the second network based in response to a verification by the second server of the encrypted user certificate.

A second embodiment of the present invention is a method for enabling a first server and a second server to authenticate a user to remotely access a device operatively connected to the second server. The method comprises the first server receiving a first set of personal information of the user from a first client over a first network; the first server providing an encrypted user certificate to the first client over the first network, wherein the encrypted user certificate includes an encryption by the first server of at least one personal attribute of the user corresponding to the first set of personal information; the second server receiving the encrypted user certificate from a second client over a second network; and the second server providing remote access information to the second client over the second network, wherein the remote access information facilitates remote access to the device by the user over the second network based in response to a verification by the second server of the encrypted user certificate.

A third embodiment of the present invention is a system comprising means for receiving a first set of personal information of the user from a first client over a first network; means for providing an encrypted user certificate to the first client over the first network, wherein the encrypted user certificate includes an encryption by the first server of at least one personal attribute of the user corresponding to the first set of personal information; means for receiving the encrypted user certificate from a second client over a second network; and means for providing remote access information to the second client over the second network, wherein the remote access information facilitates remote access to the device by the user over the second network based in response to a verification by the second server of the encrypted user certificate.

A fourth embodiment of the present invention is a server comprising a processor, and a memory storing instructions operable with the processor for providing an encrypted user certificate to a user. The instructions are executed for receiving a set of personal information of the user from a client over a network; generating the encryption user certificate in response to receiving the set of personal information of the user, wherein the encryption user certificate includes an encryption of at least one personal attribute of the user corresponding to the set of personal information of the user; and providing the encrypted user certificate to the client over the network.

A fifth embodiment of the present invention is a server comprising a processor, and a memory storing instructions operable with the processor for providing remote access information to a user. The instructions are executed for receiving an encrypted user certificate of the user from a client over a network, wherein the encryption user certificate includes an encryption of at least one personal attribute of the user; generating the remote access information based on a verification of the encrypted user certificate, wherein the remote access information facilitates remote access by the user to a device operatively controlled by the server; and providing the remote access information to the client over the network.

The foregoing embodiments as well as other embodiments, objects, aspects, features and advantages of the present invention will become further apparent from the following detailed description of the various embodiments of the present invention illustrated herein. The detailed description and drawings are merely illustrative of the present invention, rather than limiting the scope of the present invention being defined by the appended claims and equivalents thereof.

DESCRIPTION OF THE PRESENT INVENTION

Figure 1:
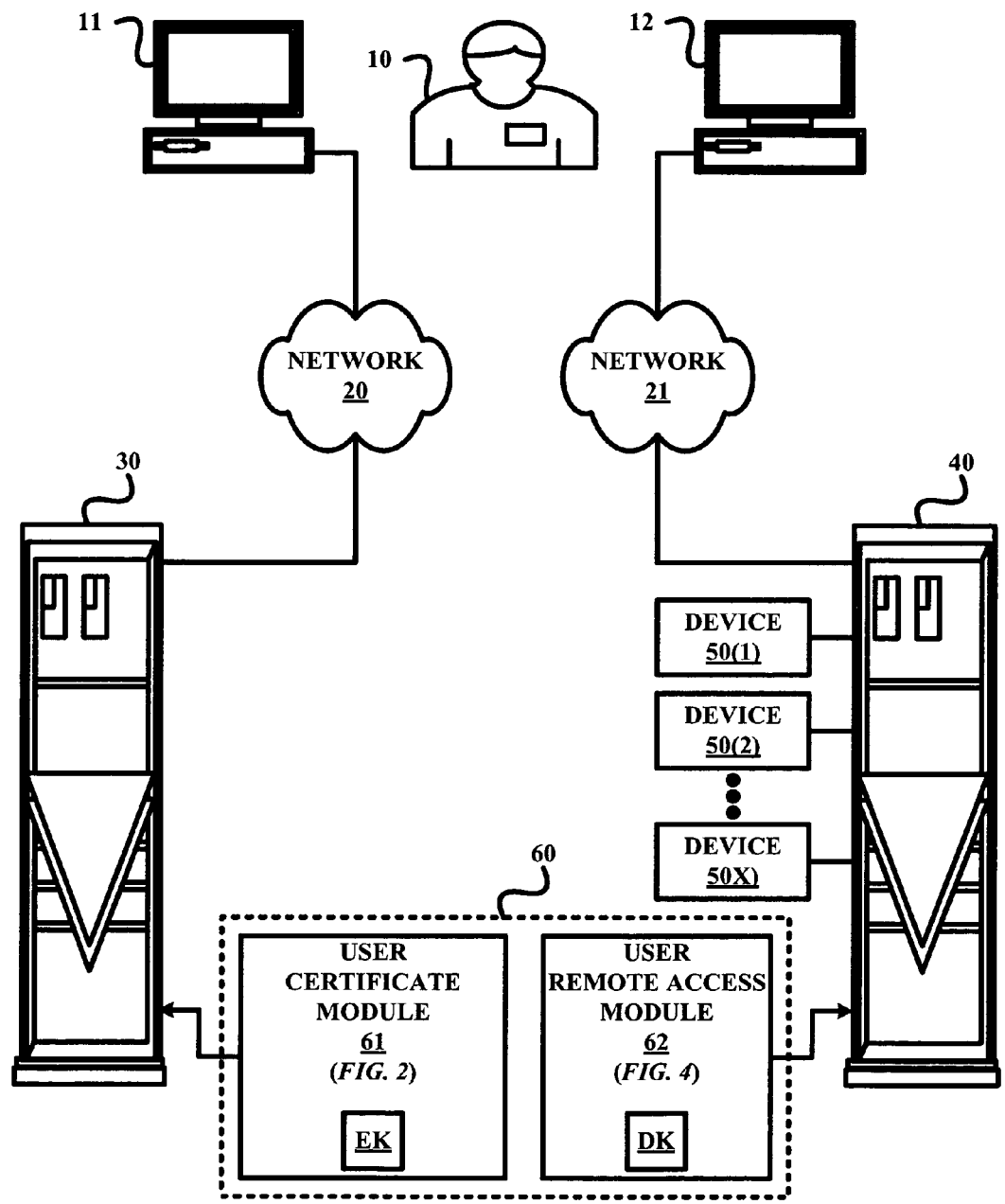
FIG. 1 illustrates an exemplary operational environment for practicing the present invention.

FIG. 1 illustrates an exemplary operational environment for practicing the present invention. Referring to FIG. 1, the present invention provides a secure, low-overhead user authenticator 60 that facilitate access by a user 10 of up to X number of devices 50 (e.g., tape storage media), where $X \geq 1$. To this end, user authenticator 60 employs a new and unique user certificate module 61 and a new and unique user remote access module 62 for implementing various methods of the present invention as will subsequently described herein in connection with the descriptions of FIGS. 2-6. A client 11 (e.g., a web browser) and a certificate server 30 (e.g., a web-based server) are physically connected to a network 20 (e.g., a public network) whereby client 11 and certificate server 30 can be operatively connected in a conventional manner to operate user certificate module 61, which employs hardware and/or software structurally configured to implement a flowchart 70 as illustrated in FIG. 2 for purposes of providing an encrypted user certificate to user 10.

Figure 2:
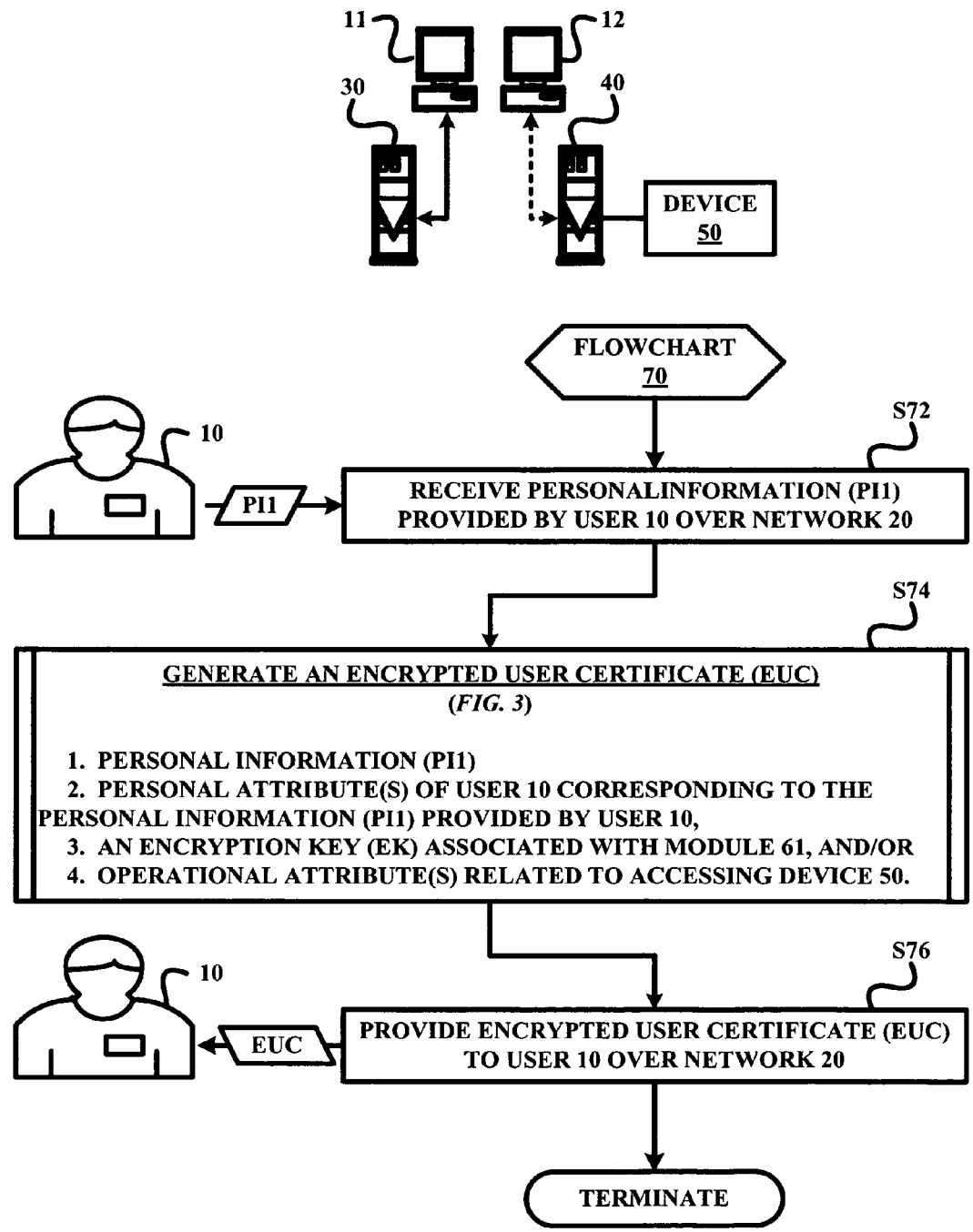
FIG. 2 illustrates a flowchart representative of an encrypted user certificate provision method in accordance with one embodiment of the present invention.

Referring additionally to FIG. 2, a stage S72 of flowchart 70 encompasses module 61 receiving personal information PI1 as provided by user 10 over network 20. Personal information PI1 includes information about user 10 that enables module 61 to recognize user 10, such as, for example, a user identification and a user password.

A stage S74 of flowchart 70 encompasses module 61 generating an encrypted user certificate EUC based on one or more variables. In one embodiment, the following four (4) variables can be utilized during stage S74. The first variable is personal information PI1 provided by user 10. The second possible variable includes one or more personal attributes of user 10 corresponding to personal information PI1 provided by user 10, such as, for example, an access level of user 10 for accessing a device 50 that corresponds to personal information of user 10 in the form of a user identification and a user password. For such an example, module 61 can maintain a file for user 10 that relates the access level of user 10 to the user identification and the user password whereby module 61 can extract the access level of user 10 upon receiving the user identification and the user password from user 10.

The third variable includes one or more operational attributes related to accessing a device 50, such as, for example, a time stamp for facilitating a determination as to whether an access time period of the encrypted user certificate EUC has or has not expired. Another exemplary operational attribute is an event identification corresponding to an event that triggered a requirement for user 10 to remotely access a device 50, such as, for example, an operational failure or malfunction by the device 50 that requires remote service by user 10.

The fourth variable is an encryption key EK, public or private, that is associated with module 61 for purposes of encrypting user certificates.

The technique by which module 61 generates the encrypted user certificate based on personal information PI1, the personal attribute(s) of user 10, the operational attribute(s) related to remotely accessing a device 50, and/or the encryption key EK is without limit. Thus, the subsequent description herein of one embodiment of stage S74 as represented by a flowchart 80 illustrated in FIG. 3 is not a limitation as to the scope of stage S74.

Figure 3:
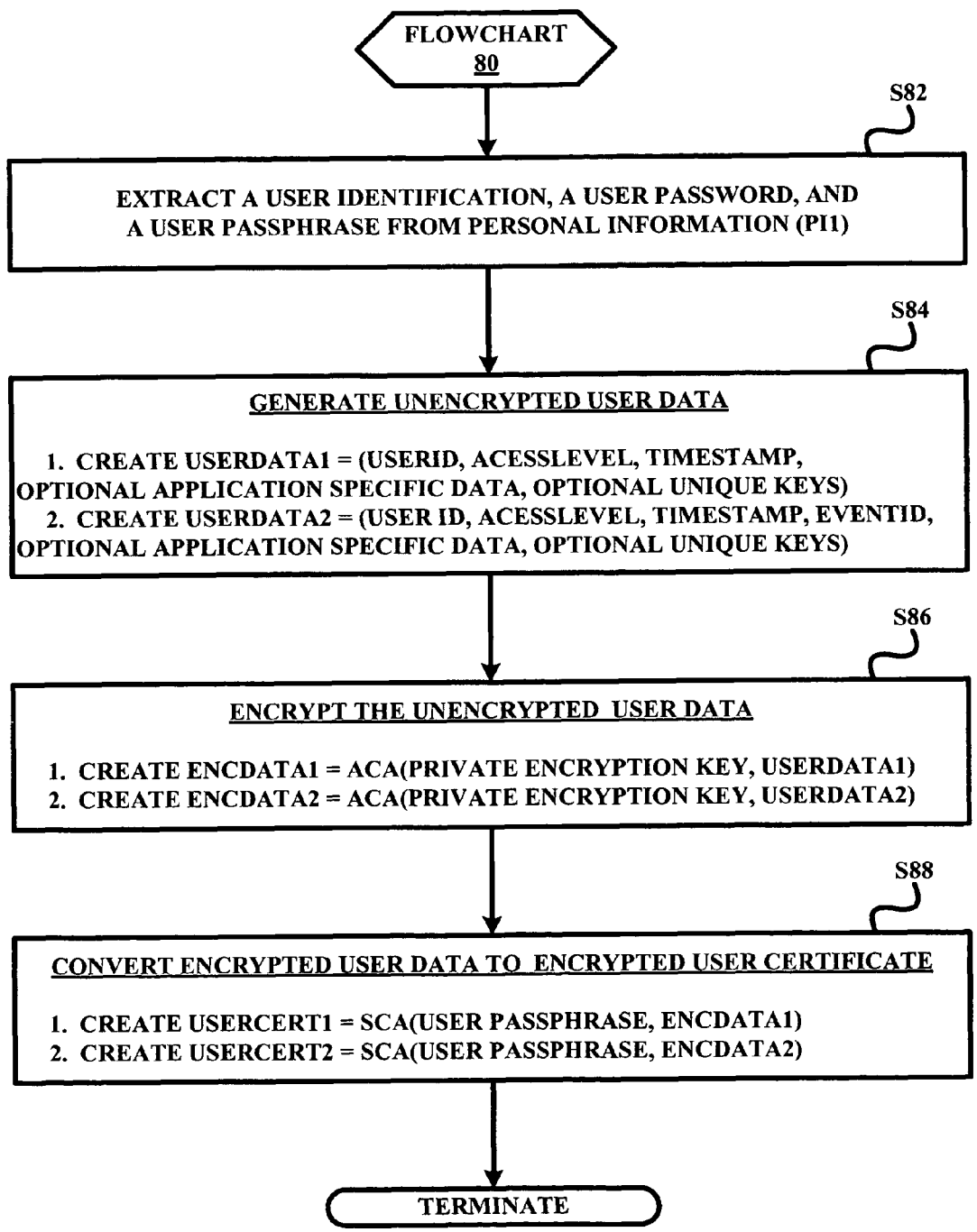
FIG. 3 illustrates a flowchart representative of an encrypted user certificate generation method in accordance with one embodiment of the present invention.

Referring additionally to FIG. 3, a stage S82 of flowchart 80 encompasses module 61 processing personal information PI1 to extract a user identification, a user password, and a user passphrase. The user identification and the user password enable module 61 to identify user 10 while the user passphrase provides additional security for module 61.

A stage S84 of flowchart 80 encompasses module 61 generating unencrypted user data in response to module 61 being able to identify user 10 with a valid user passphrase during stage S82. In one embodiment of stage S84, module 61 executes a create command for creating the unencrypted user data as a string USERDATA1 sequentially consisting of (1) the user identification of user 10, (2) an access level of user 10 and (3) a time stamp specifying a time the unencrypted user data was generated by module 61. The string USERDATA1 can further include (4) application specific data for purposes of adding application specific functionality to the unencrypted user data, and (5) one or more unique keys, such as, for example, a time period key specifying an access time period over which the resulting encrypted user certificate is valid and a random key including random data for adding additional security to the string USERDATA1. Additional unique keys can also be used for keeping an audit of remote connections by user 10, recording a time required to service a device 50, restricting systems user 10 can be operatively connected to via a client, generating automated search reports matching an account of user 10, and any pertinent geographic attributes.

In a second embodiment of stage S84, module 61 executes a create command for creating the unencrypted user data as a string USERDATA2 sequentially consisting of (1) the user identification of user 10, (2) the user access level of user 10, (3) a time stamp specifying a time the unencrypted user data was generated, and (4) an event identification indicating a notification of a particular event that triggered a requirement for user 10 to remotely access a device 50. String USERDATA2 can further includes (5) application specific data and (6) one or more unique keys as previously described herein.

Stage S86 of flowchart 80 encompasses module 61 utilizing a cipher algorithm to encrypt the unencrypted user data. In one embodiment of stage S86, module 61 executes a create command that utilizes an asymmetrical cipher algorithm ACA (e.g., Rivest-Shamir-Adleman and Rabin) to create an encrypted user data ENCDATA1 from a private encryption key EK and unencrypted user data string USERDATA1. In a second embodiment of stage S86, module 61 executes a create command that utilizes the asymmetrical cipher algorithm ACA to create an encrypted user data ENCDATA2 from the private encryption key EK and unencrypted user data string USERDATA2.

Stage S88 encompasses module 61 utilizing an additional cipher algorithm to convert the encrypted user data into an encrypted user certificate. In one embodiment of stage S88, module 61 executes a create command that utilizes a symmetrical cipher algorithm SCA (e.g., XOR) to create an encrypted user certificate USERCERT1 from the user passphrase and the encrypted user data ENCDATA1. In a second embodiment of stage S88, module 61 utilizes the symmetrical cipher algorithm SCA to create an encrypted user certificate USERCERT2 from the user passphrase and the encrypted user data ENCDATA2.

Flowchart 80 is terminated upon completion of stage S88.

Referring again to FIGS. 1 and 2, module 61 proceeds to a stage S76 of flowchart 70 upon completing stage S74. Stage S76 encompasses module 61 providing the encrypted user certificate EUC to user 10 over network 20. In one embodiment, module 61 provides encrypted user certificate EUC as USERCERT1 or USERCERT2 in a base64 format to thereby make the encrypted user certificate usable as text whereby operations such as copy/paste, save as text and transfer over modem are simplified for user 10.

Flowchart 70 is terminated upon completion of stage S76. Those having ordinary skill in the art will appreciate various advantages of flowchart 70 from the preceding description of flowchart 70. In particular, the ability to customize a degree of secure authentication of user 10 based on an application specific nature and complexity of (1) the personal information of user 10, (2) the personal attribute(s) related to user 10, (3) the operational attribute(s) related to a remote access by user 10 to a device 50, (4) the structure of the unencrypted user data, (4) the private encryption key, and (5) the cipher algorithms ACA and SCA. Additionally, the aforementioned factors can be permanently established for module 61, or periodically or sporadically replaced and/or modified in accordance with an application specific policy associated with module 61.

Figure 4:
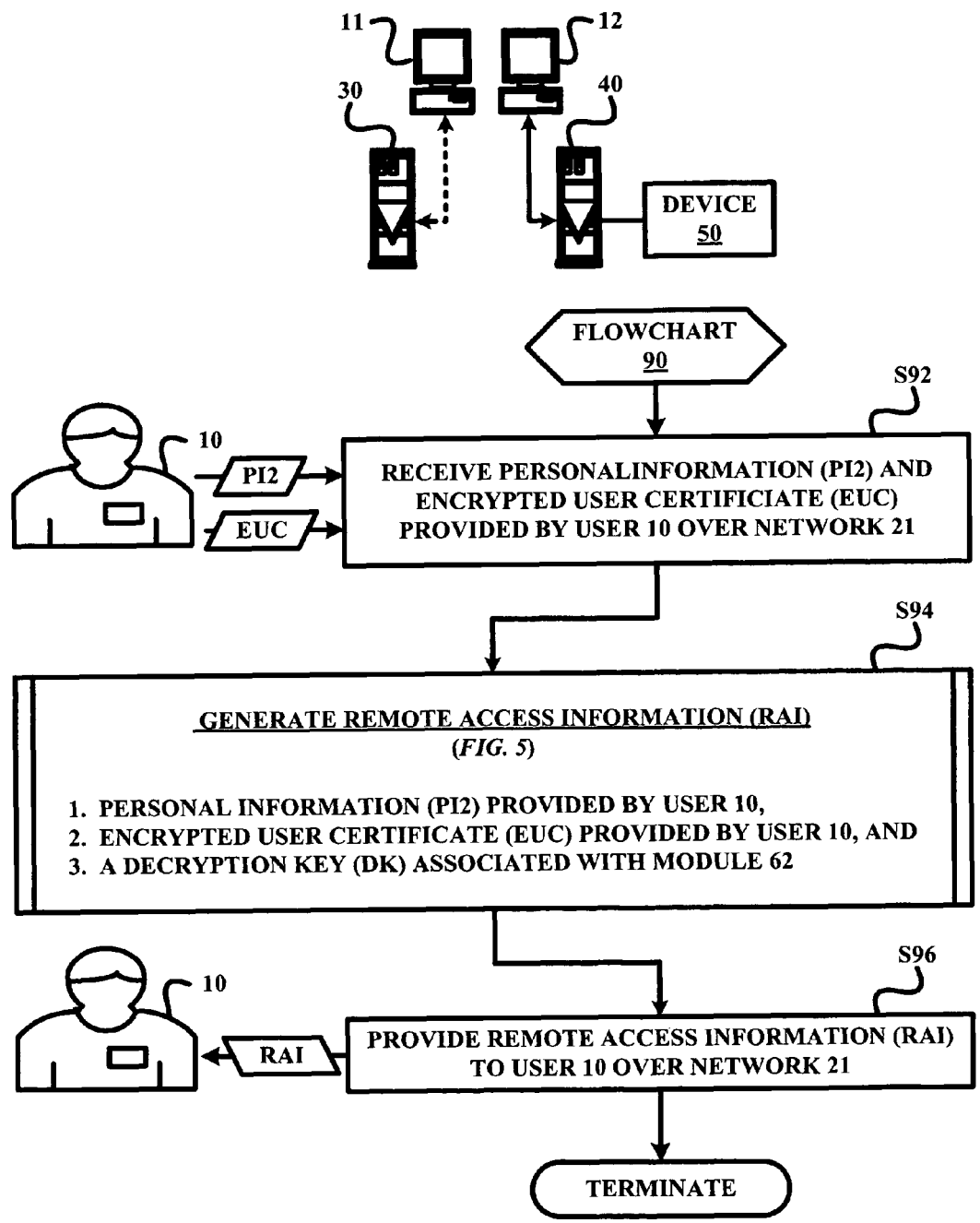
FIG. 4 illustrates a flowchart representative of a user device access method in accordance with one embodiment of the present invention.

Referring to FIG. 1, a client 12 (e.g., a tape application) and a device server 40 (e.g., a tape controller) are physically connected to a network 21 (e.g., a private network) whereby client 12 and certificate server 40 can be operatively connected in a conventional manner to operate user certificate module 62, which employs hardware and/or software structurally configured to implement a flowchart 90 as illustrated in FIG. 4 for purposes of facilitating remote access by user 10 to a device 50 based on the encrypted user certificate previously provided to user 10 by module 61.

Referring additionally to FIG. 4, a stage S92 of flowchart 90 encompasses module 62 receiving personal information PI2 and encrypted user certificate EUC as provided by user 10 over network 21. Personal information PI2 includes information about user 10 that enables module 61 to identify user 10 (e.g., user identification and user password) and information to determine the nature of a remote access to a device 50 desired by user 10 (e.g., an access level request). Encrypted user certificate EUC includes an encryption of personal information of user 10, personal attributes of user 10, operational attributes related to remotely accessing a device 50 by user 10, application specific security data, and/or one or more unique keys.

A stage S94 of module 90 encompasses module 62 generating remote access information RAI based on one or more variables. In one embodiment, the following four (3) variables can be utilized during stage S94. The first and second variables are the personal information PI2 and encryption user certificate EUC provided by user 10. The third variable is a decryption key DK, public or private, that is associated with module 62 for purposes of decrypting encrypted user certificates.

Figure 6:
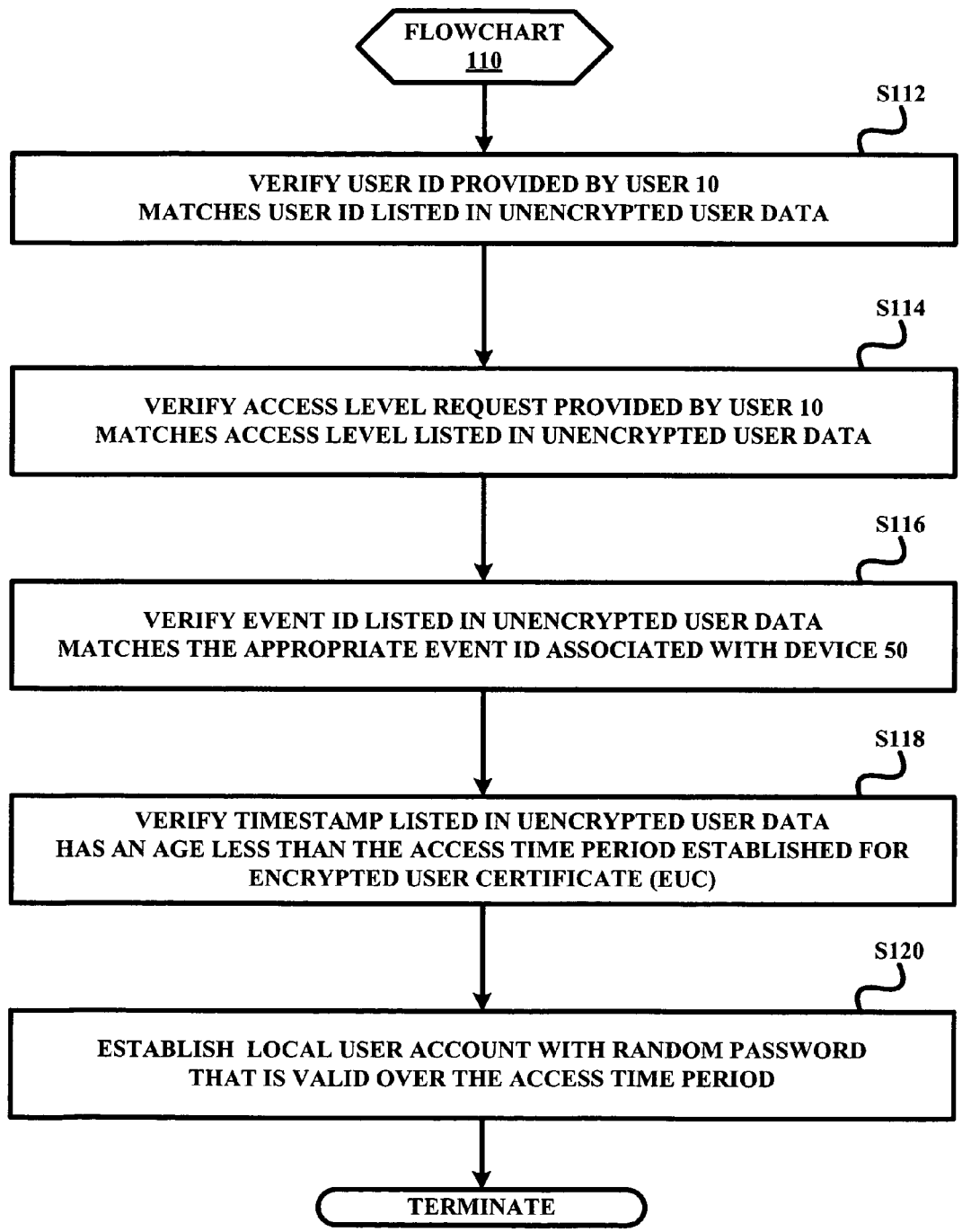
FIG. 6 illustrates a flowchart representative of a user verification method in accordance with one embodiment of the present invention.

The technique by which module 62 generates the remote access information RAI based on personal information PI1, encrypted user certificate EUC and/or decryption key DK is without limit. Thus, the subsequent description herein of one embodiment of stage S94 as represented by a flowchart 90 illustrated in FIG. 6 is not a limitation as to the scope of stage S94.

Figure 5:
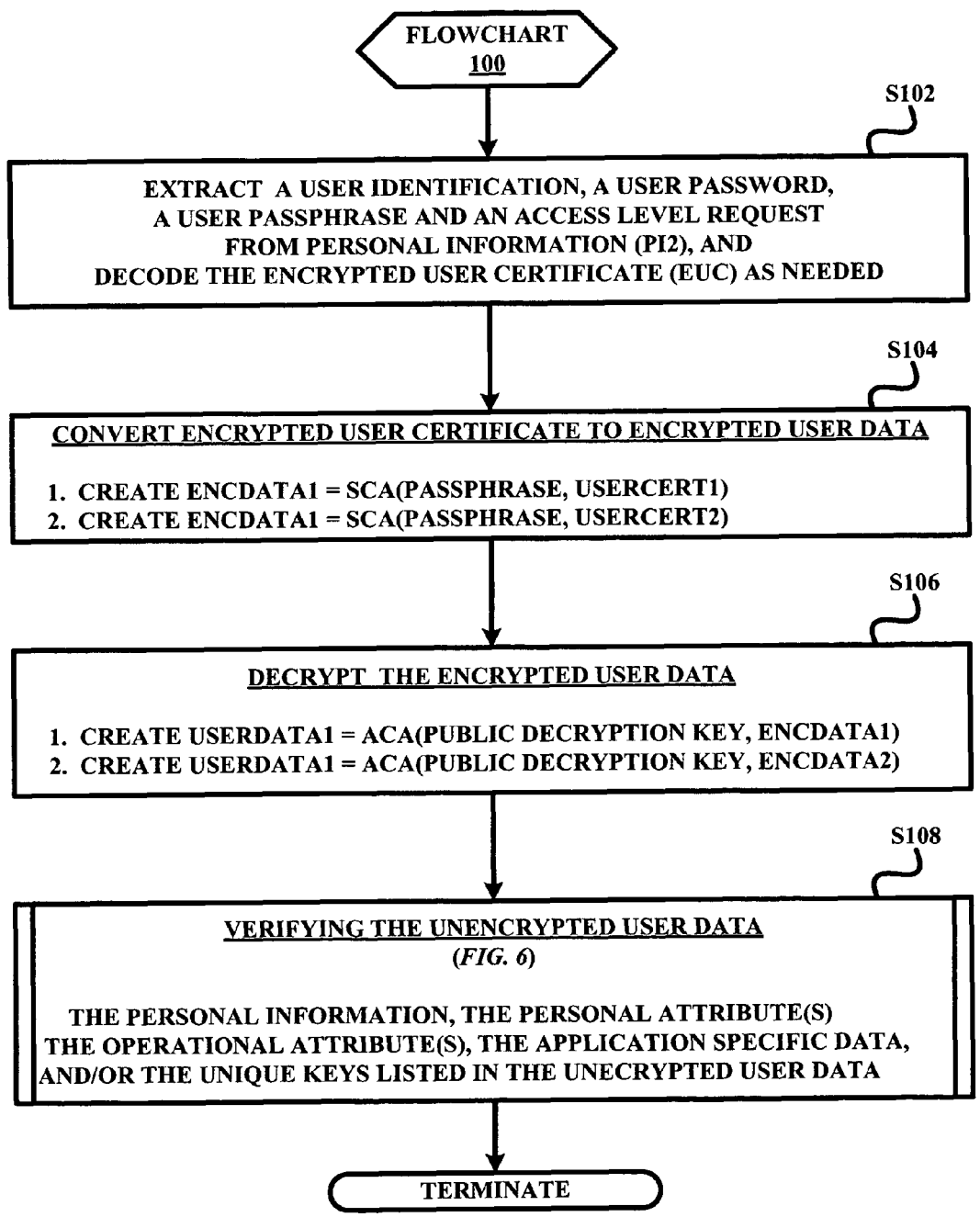
FIG. 5 illustrates a flowchart representative of an access information generation method in accordance with one embodiment of the present invention.

Referring additionally to FIG. 5, a stage S102 of flowchart 100 encompasses module 62 processing personal information PI2 to extract a user identification, a user password, a user passphrase and an access level request. The user identification and the user password enable module 62 to identify user 10 while the user passphrase provides additional security for module 62. The access level request enables module 62 to determine the nature of a remote access to a device 50 desired by user 10. Module 62 further decodes the encrypted user certificate EUC as needed, such as, for example, when encrypted user certificate EUC is in the form of USERCERT1 or USERCERT2 in a base64 format A stage S104 of flowchart 100 encompasses module 62 utilizing a cipher algorithm to convert the encrypted user certificate EUC to the encrypted user data. In one embodiment of stage S108, module 62 executes a create command that utilizes a symmetrical cipher algorithm SCA (S88, FIG. 3) to create encrypted user data ENCDATA1 from the user passphrase and the encrypted user certificate USERCERT1. In a second embodiment of stage S108, module 62 executes a create command that utilizes a symmetrical cipher algorithm SCA (S88, FIG. 3) to create encrypted user data ENCDATA2 from the user passphrase and the encrypted user certificate USERCERT2.

A stage S106 of flowchart 100 encompasses module 62 utilizing an additional cipher algorithm to decrypt the encrypted user data. In one embodiment of stage S106, module 62 executes a create command that utilizes an asymmetrical cipher algorithm ACA (S86, FIG. 3) to create an unencrypted user data USERDATA1 from a public decryption key DK and encrypted user data ENCDATA1. In a second embodiment of stage S106, module 62 executes a create command that utilizes an asymmetrical cipher algorithm ACA (S86, FIG. 3) to create an unencrypted user data USERDATA2 from a public decryption key DK and encrypted user data ENCDATA2.

A stage S108 of flowchart 80 encompasses module 62 verifying the unencrypted user data. In one embodiment, module 62 verifies the personal information of user 10, personal attribute(s) of user 10, operational attribute(s) related to remotely accessing a device 50 by user 10, the application specific security data, and/or the unique key(s) listed in the unencrypted user data. The technique by which module 62 authenticates user 10 during stage S108 is without limit. Thus, the subsequent description herein of one embodiment of stage S108 as represented by a flowchart 110 illustrated in FIG. 6 is not a limitation as to the scope of stage S108.

Referring to additionally to FIG. 6, flowchart 100 is implemented for purposes of authenticating user 10 based on unencrypted user data string USERDATA1 and unencrypted user data string USERDATA2 as previously described herein. A stage S112 of flowchart 110 encompasses module 62 verifying the user ID provided by user 10 matches the USERID attribute listed in the unencrypted user data string USERDATA1 and unencrypted user data string USERDATA2. A stage S114 of flowchart 110 encompasses module 62 verifying the access level request provided by user 10 matches the access level attribute listed in the unencrypted user data string USERDATA1 and the unencrypted user data string USERDATA2.

A stage S116 of flowchart 110 encompasses module 62 verifying the event ID listed in the unencrypted user data string USERDATA2 matches the appropriate event ID previously generated to notify user 10 of a particular event that triggered a need for user 10 to remotely access device 50. Stage S116 is inapplicable to the unencrypted user data string USERDATA1.

A stage S118 of flowchart 110 encompasses module 62 verifying the timestamp listed in the unencrypted user data string USERDATA1 and the unencrypted user data string USERDATA2 has an age less than the access time period for the unencrypted user data string USERDATA1 and the unencrypted user data string USERDATA2. As previously described herein, the access time period can be listed in the unencrypted user data string USERDATA1 and the unencrypted user data string USERDATA2 as a unique key or based on an application specific policy of module 62.

A S120 of flowchart 110 encompasses module 62 establishing a local user account with a random password that is valid over the access time period. The local user account and random password are formatted by module 62 as needed to be included in the remote access information RAI. Flowcharts 100 and 110 are terminated upon completion of stage S120.

Referring again to FIGS. 1 and 4, module 62 proceeds to a stage S96 of flowchart 90 upon completing stage S94. Stage S96 encompasses module 62 providing the remote access information RAI to user 10 over network 21. Flowchart 90 is terminated upon completion of stage S96. Those having ordinary skill in the art will appreciate various advantages of flowchart 90 from the preceding description of flowchart 90. In particular, the ability to authenticate user 10 for remote access of a device 50 in a secure and low-overhead manner.

Referring to FIGS. 2 and 4, to facilitate an understanding of a complete authentication of user 10 under the principles of the present invention, flowcharts 70 and 90 were described herein in a positive context based on user 10 providing valid and accurate personal information and encrypted user certificate as needed. Those having ordinary skill in the art will appreciate that flowcharts 70 and 90 can be terminated at any stage in response to user 10 providing invalid or inaccurate personal information and/or encrypted user certificate.

Referring to FIGS. 1-6, in one practical embodiment, modules 61 and 62 (FIG. 1) are embodied as software modules installed within a memory of respective servers 30 and 40 (FIG. 1) whereby processors of respective servers 30 and 40 can execute modules 61 and 62 to perform various operations of the present invention as exemplary illustrated in FIGS. 2-6. Modules 61 and 62, when embodied as a software module, can be written in any conventional programming language by those having ordinary skill in the art appreciating the description herein of FIGS. 2-6.

Referring to FIG. 1, the operational environment as shown was provided for purposes of facilitating an understanding of the present invention whereby those having ordinary skill in the art will appreciate other operational environments for practicing the present invention. For example, an operational environment were wireline connections, wireless connections or a mixture thereof are implemented, were clients 11 and 12 are implemented as client applications on the same physical computer platform (e.g., a workstation), and/or were networks 20 and 21 are separate and distinct virtual networks existing on the same physical network.

Referring to FIGS. 3 and 5, it is recommended that the private encryption key ("PEK") and the public decryption key ("PDK") are selected whereby an asymmetric cipher algorithm ACA implementation of ACA(PEK, ACA(PDK, data)) equals an implementation of ACA(PDK, ACA(PEK, data)), which equals the data. Further, it is recommended that the private encryption key and the public decryption key are also selected whereby an asymmetric cipher algorithm ACA implementation of ACA(any key, ACA(PEK|PDK, data)) equals the data. Furthermore, any compromise of the private encryption key can trigger a regeneration and distribution of a pairing of the private encryption key and the public decryption key to respective modules 61 and 62.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

I claim:

1. A method for enabling a first client and a second client to establish an authentication of a user to remotely access a device, the method comprising:

the first client providing a first set of personal information of the user to a first server over a first network, wherein the first client and the first server communicate over the first network;

the first client receiving an encrypted user certificate from the first server over the first network, wherein the encrypted user certificate includes an encryption by the first server of user data comprising at least one personal attribute of the user corresponding to the first set of personal information;

the second client providing the encrypted user certificate to a second server over a second network, wherein the second client, the second server, and the device communicate over the second network, wherein the first and second clients comprise different applications each having different functionality;

the second client receiving remote access information from the second server over the second network;

a user remote access module in the second server receiving the encrypted user certificate and a second set of personal information;

extracting, by the user remote access module, a user identification and access level request from the second set of personal information;

using, by the user remote access module, the user certificate to determine the encrypted user data and decrypting the user encrypted user data to obtain the unencrypted user data; and verifying that the unencrypted user data matches the extracted user identification and the access level request from the second set of personal information, wherein the remote access information facilitates remote access to the device by the second client over the second network in response to the verification by the second server of the encrypted user certificate.

2. The method of claim 1, wherein the first set of personal information includes a user identification, a user password, and a user passphrase.

3. The method of claim 1, wherein the encrypted user certificate further includes an encryption by the first server of at least a portion of the first set of personal information.

4. The method of claim 1, wherein the encrypted user certificate further includes an encryption by the first server of at least one operational attribute related to the remote access of the device by the user.

5. The method of claim 1, wherein the encrypted user certificate further includes an encryption by the first server of a set of application specific data for adding specific security to the encrypted user certificate.

6. The method of claim 1, wherein the encrypted user certificate further includes an encryption by the first server of at least an unique key related to authenticating the user, wherein the second server receives from the second client computer information the second client computer submits to access the device, wherein the second server decrypts the encrypted user certificate to produce unencrypted user data including the unique key and verifies whether the information the second client computer submits to access the device matches the unencrypted user data including the encrypted unique key from the encrypted user certificate.

7. The method of claim 1, wherein the remote access information includes a user account and a random password established by the second server for the user to gain access to the device over the second network.

8. The method of claim 7, wherein the user account and the random password are valid over an access time period associated with the encrypted user certificate.

9. The method of claim 1, wherein the encrypted user certificate is valid over an access time period and invalid upon an expiration of the access time period.

10. A method for enabling a first server and a second server to authenticate a user to remotely access a device operatively connected to the second server, the method comprising:

the first server receiving a first set of personal information of the user from a first client over a first network, wherein the first client and the first server communicate over the first network;

the first server providing an encrypted user certificate to the first client over the first network, wherein the encrypted user certificate includes an encryption by the first server of user data comprising at least one personal attribute of the user corresponding to the first set of personal information;

the second server receiving the encrypted user certificate from a second client over a second network, wherein the second client, the second server, and the device communicate over the second network, wherein the first and second clients comprise different applications each having different functionality;

the second server providing remote access information to the second client over the second network;

a user remote access module in the second server receiving the encrypted user certificate and a second set of personal information;

extracting, by the user remote access module, a user identification and access level request from the second set of personal information;

using, by the user remote access module, the user certificate to determine the encrypted user data and decrypting the user encrypted user data to obtain the unencrypted user data; and verifying that the unencrypted user data matches the extracted user identification and the access level request from the second set of personal information, wherein the remote access information facilitates remote access to the device by the second client over the second network based in response to the verification by the second server of the encrypted user certificate.

11. The method of claim 10, wherein the first set of personal information includes a user identification, a user password, and a user passphrase.

12. The method of claim 10, wherein the encrypted user certificate further includes an encryption by the first server of at least a portion of the first set of personal information.

13. The method of claim 10, wherein the encrypted user certificate further includes an encryption by the first server of at least one operational attribute related to the remote access of the device by the user.

14. The method of claim 10, wherein the encrypted user certificate further includes an encryption by the first server of a set of application specific data for adding specific security to the encrypted user certificate.

15. The method of claim 10, wherein the encrypted user certificate further includes an encryption by the first server of at least an unique key related to authenticating the user, wherein the second server receives from the second client computer information the second client computer submits to access the device, wherein the second server decrypts the encrypted user certificate to produce unencrypted user data including the unique key and verifies whether the information the second client computer submits to access the device matches the unencrypted user data including the encrypted unique key from the encrypted user certificate.

16. The method of claim 10, wherein the remote access information includes a user account and a random password established by the second server for the user to gain access to the device over the second network.

17. The method of claim 16, wherein the user account and the random password are valid over an access time period associated with the encrypted user certificate.

18. The method of claim 10, wherein the encrypted user certificate is valid over an access time period and invalid upon an expiration of the access time period.

19. A server environment in communication with a first and second clients and a device over a first and second networks, respectively, comprising:

a first server comprising:
 a first processor; and
 a first memory storing instructions operable with the first processor for providing an encrypted user certificate to a user at the first client, wherein the first client and the first server communicate over the first network, the instructions being executed for:
  receiving a set of personal information of the user from the first client over the first network,
  generating the encryption user certificate in response to receiving the set of personal information of the user, wherein the encryption user certificate includes an encryption of user data comprising at least one personal attribute of the user corresponding to the set of personal information of the user; and
  providing the encrypted user certificate to the first client over the first network; and a second server comprising:
 a second processor; and
 a first memory storing instructions operable with the second processor, the instructions being executed for:
  receiving the encrypted user certificate from the second client over the second network, wherein the second client, the second server, and the device communicate over the second network, wherein the first and second clients comprise different applications each having different functionality; and
  generating remote access information based on a verification of the encrypted user certificate;
  receiving the encrypted user certificate and a second set of personal information;
  extracting a user identification and access level request from the second set of personal information;
  using the user certificate to determine the encrypted user data and decrypting the user encrypted user data to obtain the unencrypted user data; and
  verifying that the unencrypted user data matches the extracted user identification and the access level request from the second set of personal information, wherein the remote access information facilitates remote access by the second client to the device operatively controlled by the second server based in response the a verification by the second server of the encrypted user certificate; and
  providing the remote access information to the second client over the network.

20. The server environment of claim 19, wherein the generating by the first server of the encryption user certificate in response to receiving the set of personal information of the user includes:

generating unencrypted user data including the at least one personal attribute of the user corresponding to the set of personal information of the user.

21. The server environment of claim 20, wherein the generating by the first server of the encryption user certificate in response to receiving the set of personal information of the user further includes:

encrypting the unencrypted user data.

22. The server environment of claim 21, wherein the generating by the first server of the encryption user certificate in response to receiving the set of personal information of the user further includes:

converting the encrypted user data into the encrypted user certificate.

23. The server environment of claim 19, wherein the encrypted user certificate further includes at least one of at least a portion of the set of personal information of the user, at least one operational attribute related to the remote access of the device by the user, a set of application specific data for adding specific security to the encrypted user certificate, and at least an unique key related to authenticating the user.

24. The server environment of claim 20, wherein the generating by the second server of the remote access information based on a validity of the encrypted user certificate includes:

generating encrypted user data from the encrypted user certificate, wherein the encrypted user data includes encryption of at least one personal attribute of the user.

25. The server environment of claim 24, wherein the generating by the second server of the remote access information based on a validity of the encrypted user certificate further includes:

decrypting the encrypted user data.

26. The server environment of claim 25, wherein the generating by the second server of the remote access information based on a validity of the encrypted user certificate further includes:

verifying the unencrypted user data.

27. The server environment of claim 19, wherein the encrypted user certificate further includes an encryption by the first server of at least unique key related to authenticating the user, wherein the second server receives from the second client computer information the second client computer submits to access the device, wherein the second server decrypts the encrypted user certificate to produce unencrypted user data including the unique key and verifies whether the information the second client computer submits to access the device matches the unencrypted user data including the encrypted unique key from the encrypted user certificate.

28. A system in communication with a first server over a first network and a second server and device over a second network, comprising a computer platform implement:

a first client executed to perform:

providing a first set of personal information of the user to the first server over a first network, wherein the first client and the first server communicate over the first network; and receiving an encrypted user certificate from the first server over the first network, wherein the encrypted user certificate includes an encryption by the first server of user data comprising at least one personal attribute of the user corresponding to the first set of personal information; and a second client executed to perform:

providing the encrypted user certificate to a second server over a second network, wherein the second client, the second server, and the device communicate over the second network, wherein the first and second clients comprise different applications each having different functionality; and receiving remote access information from the second server over the second network;

sending the encrypted user certificate and a second set of personal information to the second server, wherein the second server extracts a user identification and access level request from the second set of personal information and uses the user certificate to determine the encrypted user data and decrypting the user encrypted user data to obtain the unencrypted user data, wherein the second server verifies the unencrypted user data matches the extracted user identification and the access level request from the second set of personal information, wherein the remote access information facilitates remote access to the device by the second client over the second network in response to the verification by the second server of the encrypted user certificate.

29. The method of claim 1, wherein the first client comprises a web browser and wherein the second client comprises a device application, and the second server a device controller that controls the device.

30. The system of claim 28, wherein the first client comprises a web browser and wherein the second client comprises a device application, and the second server a device controller that controls the device.

* * * * *